United States Patent
Keech et al.

(10) Patent No.: US 7,228,748 B2
(45) Date of Patent: Jun. 12, 2007

(54) ELECTROMAGNETIC FLOW METER INSERT

(75) Inventors: Ray Keech, Stonehouse (GB); David Lincoln, Stonehouse (GB); Phillip Stafford, Stonehouse (GB)

(73) Assignee: ABB Limited (GB)

(*) Notice: Subject to any disclaimer, the term of this patent is extended or adjusted under 35 U.S.C. 154(b) by 0 days.

(21) Appl. No.: 11/015,679

(22) Filed: Dec. 17, 2004

(65) Prior Publication Data

US 2005/0199073 A1     Sep. 15, 2005

(30) Foreign Application Priority Data

Dec. 19, 2003    (GB)    ................... 0329450.1

(51) Int. Cl.
*G01F 1/58* (2006.01)

(52) U.S. Cl. .................................... 73/861.12

(58) Field of Classification Search ............. 73/861.12, 73/861.08
See application file for complete search history.

(56) References Cited

U.S. PATENT DOCUMENTS

| | | | |
|---|---|---|---|
| 4,434,666 A | | 3/1984 | Hemp et al. |
| 5,150,061 A | * | 9/1992 | Castel et al. ................ 73/61.41 |
| 5,773,723 A | * | 6/1998 | Lewis et al. ............. 73/861.12 |
| 6,237,424 B1 | | 5/2001 | Salmasi et al. |
| 6,595,069 B2 | * | 7/2003 | Frey et al. ................ 73/861.11 |
| 6,817,249 B2 | * | 11/2004 | Yamazaki ................ 73/861.12 |

FOREIGN PATENT DOCUMENTS

| | | |
|---|---|---|
| DE | 19708857 A1 | 7/1998 |
| DE | 10046195 A1 | 4/2002 |
| GB | 2081449 A | 2/1982 |
| GB | 2314902 A | 1/1998 |
| GB | 2324606 A | 10/1998 |
| GB | 2328021 A | 2/1999 |
| GB | 2358064 A | 7/2001 |
| GB | 2371368 A | 7/2002 |
| GB | 2376529 A | 12/2002 |
| GB | 2377030 A | 12/2002 |
| GB | 2385667 A | 8/2003 |
| JP | 58085118 A | 5/1983 |
| JP | 04295722 A | 10/1992 |
| JP | 2002333354 A | 11/2002 |
| WO | WO 01/50094 A2 | 7/2001 |

* cited by examiner

*Primary Examiner*—Harshad Patel
(74) *Attorney, Agent, or Firm*—Knobbe, Martens, Olson & Bear, LLP (57) ABSTRACT

An insert for an electromagnetic flow meter is disclosed. The insert is arranged to be positioned within a flow conduit having a flow conduit cross-section to define a flow path for fluid, wherein the insert comprises an inlet, a measuring section with a measuring cross-section different from the flow conduit cross-section and having at least two substantially parallel sides over at least part of its length, and an outlet.

24 Claims, 7 Drawing Sheets

ELECTROMAGNETIC FLOW METER INSERT

BACKGROUND OF THE INVENTION

1. Field of the Invention

The present invention relates to the field of electromagnetic flow meters, in particular, to the field of insert to define a fluid flow path within an electromagnetic flow meter.

2. Description of the Related Technology

Electromagnetic flow meters may be used to determine the rate of flow of fluid in a conduit. The conduit itself may be used to define the fluid path within the flow meter or an insert, placed within the conduit, may define the fluid path within the flow measurement zone.

Prior art flow meters, or flow meter inserts, generally have a substantially circular cross-section, which may be designed to match the cross-section of the fluid conduit. Circular cross-section inserts may be manufactured easily and may provide an effective way to contain the fluid, which may be under pressure. The walls of the circular fluid conduit may further be used to support the flow meter insert and, since it is not required to be self-supporting, the flow meter insert may be manufactured economically as a lightweight insert.

A disadvantage of such flow meters or flow meter inserts, however, is that, due to their generally circular cross-sections, approximations must be made in determining the flow rate of the fluid, they require typically 5–10 diameters of upstream pipe work to ensure an accurate measurement or they are susceptible to the pipe work conditions in surrounding the installation.

Flow meters or flow meter inserts with substantially square or rectangular cross-sections have been designed for specialist purposes for which a measurement with immunity to flow conditions is required. Such flow meters may provide improved performance when compared to the standard circular cross-section flow meters, but they tend to be bulky to provide the strength required to form a flow conduit and hence are not suitable as general-purpose flow meters.

SUMMARY OF CERTAIN INVENTIVE EMBODIMENTS

A first aspect provides an insert for an electromagnetic flow meter arranged to be positioned within a flow conduit having a flow conduit cross-section to define a flow path for fluid, wherein the insert comprises an inlet, a measuring section with a measuring cross-section different to the flow conduit cross-section and having at least two substantially parallel sides over at least part of its length and an outlet.

Using flow meter inserts with at least two substantially parallel sides may also advantageously improve the accuracy of the flow meter readings since such flow meters may be closer to a theoretically ideal flow meter, that is a flow meter with a uniform weight function. This may allow accurate measurements to be obtained even in low hydraulic performance cases. Having at least two substantially parallel sides may also increase the available space for the electrodes and decrease the pressure drops. In addition, the hydraulic performance of the meter maybe improved so that the meter may be less sensitive to how it is installed and may provide a higher performance in a non-optimal installation. Also, for a given geometry, the magnetic field may be increased by using an insert with at least two substantially parallel sides. This may allow the coil of the flow meter to be used more efficiently so that a more economical coil may be used and/or less power may be used to drive the coils.

In one embodiment, the inlet comprises an inlet section with a cross-section having a corresponding shape to that of the flow conduit. This may allow fluid to flow smoothly into the insert.

In one embodiment, the outlet comprises an outlet section with a cross-section having a corresponding shape to that of the flow conduit. This may further help to smooth the flow of the fluid through the insert, and particularly through the measuring section of the insert.

In one embodiment, the cross-sectional shape of at least one of the inlet and the outlet corresponds to the cross-sectional shape of the measuring section.

In one embodiment, the insert further comprises a transition section between at least one of the inlet and the outlet and the measuring section wherein the cross-sectional shape of the insert transforms smoothly from the shape of the inlet and/or the outlet to the shape of the measuring section in the transition section.

Hence a smooth transition between the shapes of the two sections may be provided. This may minimise the disturbance of the flow caused by the changing shape of the conduit and may allow a more accurate flow rate measurement to be obtained.

In one embodiment, the inlet and/or outlet sections may comprise a substantially circular cross-section. Hence the inlet and/or outlet sections may have a cross-sectional shape corresponding to that of a circular conduit.

In one embodiment, the cross-sectional area of the measuring section may cover at least 70% of the cross-sectional area of the flow conduit. Further, the cross-sectional area of the measuring section may cover at least 80% of the cross-sectional area of the flow conduit.

In an alternative embodiment, the cross-sectional area of the measuring section may cover less than around 50% of the cross-sectional area of the flow conduit. This may be useful in a low flow rate system or to increase the uniformity of the magnetic field in the measuring section, as discussed in more detail below.

In one embodiment, the insert is manufactured by moulding or extrusion, for example by injection moulding, transfer moulding or rotational moulding. Moulding the flow meter insert, from a material such as a plastics or rubber material may allow non-circular flow meter inserts to be provided that are lightweight and economical but that are strong and robust enough to maintain their integrity under fluid pressure.

In one embodiment, the insert may be manufactured substantially from a thermoplastic material; for example, the insert may be manufactured from a glass-loaded plastics material.

In one embodiment, the insert maybe manufactured from ABS (Acrylonitrilebutadiene Styrene). Alternatively, the insert may be manufactured from another similar material, such as another polymer material, another plastics material or natural or synthetic rubber, such as a soft rubber material or a hard rubber material.

In an alternative embodiment, the insert maybe manufactured from a fluorocarbon material such as PTFE (Teflon (RTM)) or ETFE or the insert may be manufactured from PVDF.

The insert may also be manufactured as a flexible rubber insert.

According to a further embodiment, the insert may be manufactured substantially from a thermoset material.

In one embodiment, the insert may be manufactured substantially from a reinforced thermoset material.

According to a further preferable embodiment, the insert may be manufactured substantially from a reinforced thermoplastics material; for example, the insert may be manufactured from a fibreglass material.

The insert may be bonded to backpotting, which may be provided to give the insert the strength and rigidity required under fluid pressure. The method of manufacture of the insert is preferably selected based on the material used for the insert and the most suitable method for the particular material selected, which may be a prior art method, may be used.

In one embodiment, the insert has a substantially square or rectangular cross-section over at least part of its length. This may provide the optimal cross-sectional shape to improve the performance of the flow meter.

In one embodiment, the cross-sectional size and/or shape of the insert may be arranged so that a substantially uniform magnetic field may be applied over substantially the whole cross-sectional area of the measuring section insert. As discussed in more detail below, this may advantageously allow a more accurate measurement of the flow rate to be determined. In some embodiments, this may be achieved, for example by infilling the corners of a substantially square insert, by changing the shape of the flow conduit, for example to a substantially elliptical or rectangular cross-section, so that the magnetic flux lines preferentially pass directly across the measuring section, or by providing an insert with a measuring section having a cross-sectional area much smaller than that of the flow conduit.

In one embodiment, the insert may be formed in more than one piece.

The flow meter in which the insert may be deployed may be a wetted-type or a capacitive-type flow meter.

The electrodes of the flow meter may be provided integrally with the insert or may be provided as a separate component, for example they may be coupled to the insert. The electrodes may comprise metallic or conductive plastics electrodes. A variety of electrode configurations may be used in conjunction with the insert and the electrode configuration used may be determined, at least in part, by the cross-section of the insert.

Similarly, the magnetic field generating means maybe provided integrally with or maybe coupled to the insert. The magnetic field generating means may comprise a magnetic circuit. The magnetic field generating means or magnetic circuit may be provided internally or externally of the insert.

In one embodiment, an electrostatic screen may be provided as part of or in addition to the insert.

In one embodiment, the insert is back-potted on insertion into a flow conduit. Back-potting may allow the insert to be supported and stabilised within the conduit and hence may increase the reliability of the flow measurements.

A further aspect provides a method of manufacturing an insert for an electromagnetic flow meter comprising forming an insert by extrusion wherein the insert is formed such that the insert has a conduit therethrough and comprises an inlet, a measuring section with a cross-section having at least two substantially parallel sides over at least part of its length and an outlet.

According to a preferable embodiment, the inlet comprises an inlet section with a cross-section having a corresponding shape to that of the flow conduit.

In one embodiment, the outlet comprises an outlet section with a cross-section having a corresponding shape to that of the flow conduit.

In one embodiment, the insert is extruded within a tube having a shape corresponding to that of the formed insert.

Forming the insert using the methods described herein may allow a robust but lightweight insert to be formed.

In one embodiment, the insert is formed from a shape-memory material.

In one embodiment, the insert is formed substantially from a thermoplastic material; for example, the insert may be manufactured from a glass-loaded plastics material.

In a further preferable embodiment, the insert is formed substantially from ABS (Acrylonitrile butadiene Styrene)

In one embodiment, the insert is formed substantially from a plastics material, such as PTFE or PVDF, or from natural or synthetic rubber, such as a soft rubber material.

According to a further embodiment, the insert may be manufactured substantially from a thermoset material.

In one embodiment, the insert may be manufactured substantially from a reinforced thermoset material.

According to a further preferable embodiment, the insert maybe manufactured substantially from a reinforced thermoplastics material; for example, the insert may be manufactured from a fibreglass material.

A further aspect provides an electromagnetic flow meter comprising:
   a section of flow conduit;
   an insert according to the first aspect or any of its preferred features.

The insert may allow the electromagnetic flow meter to be assembled reliably and efficiently.

A further aspect provides a method of manufacturing a flow meter comprising:
   inserting an insert into a flow conduit having a flow conduit cross-section, wherein the insert comprises an inlet, a measuring section with a measuring cross-section different to the flow conduit cross-section and having at least two substantially parallel sides over at least part of its length and an outlet;
   back-potting the insert to support the insert within the flow conduit.

In one embodiment, the insert comprises an insert according to the first aspect or any of its is preferable features.

In one embodiment, the method further comprises providing magnetic field generating means and/or electrodes in conjunction with the insert. The magnetic field generating means and/or the electrodes may be provided integrally with or separately from the insert. The magnetic field generating means and the electrodes may be provided within or outside the flow conduit.

The method may further comprise providing an electrostatic screen in conjunction with the insert. The screen may be formed integrally with the insert or may be coupled to the insert before the insert is placed within the flow conduit.

The flow meter may be a wetted-type or a capacitive-type flow meter.

In one embodiment, the insert is arranged within the flow conduit so that a substantially uniform magnetic field is provided across substantially the whole cross-sectional area of the measuring section of the insert.

This feature may be provided, for example, by obscuring from the fluid regions of the insert where the magnetic field is not uniform, by providing a flow conduit shaped so that the magnetic flux lines preferentially pass directly across the measuring section (for example, using a substantially elliptical or substantially rectangular flow conduit), or by providing an insert with a substantially smaller cross-sectional area than the flow conduit.

A skilled person will appreciate that variations of detail may be provided and features of one aspect may be applied to other aspects within the scope of the invention as set out in the claims.

BRIEF DESCRIPTION OF THE DRAWINGS

Embodiments of the flow meter insert will now be described with reference to the drawings in which.

DETAILED DESCRIPTION OF CERTAIN INVENTIVE EMBODIMENTS

Figure 1:
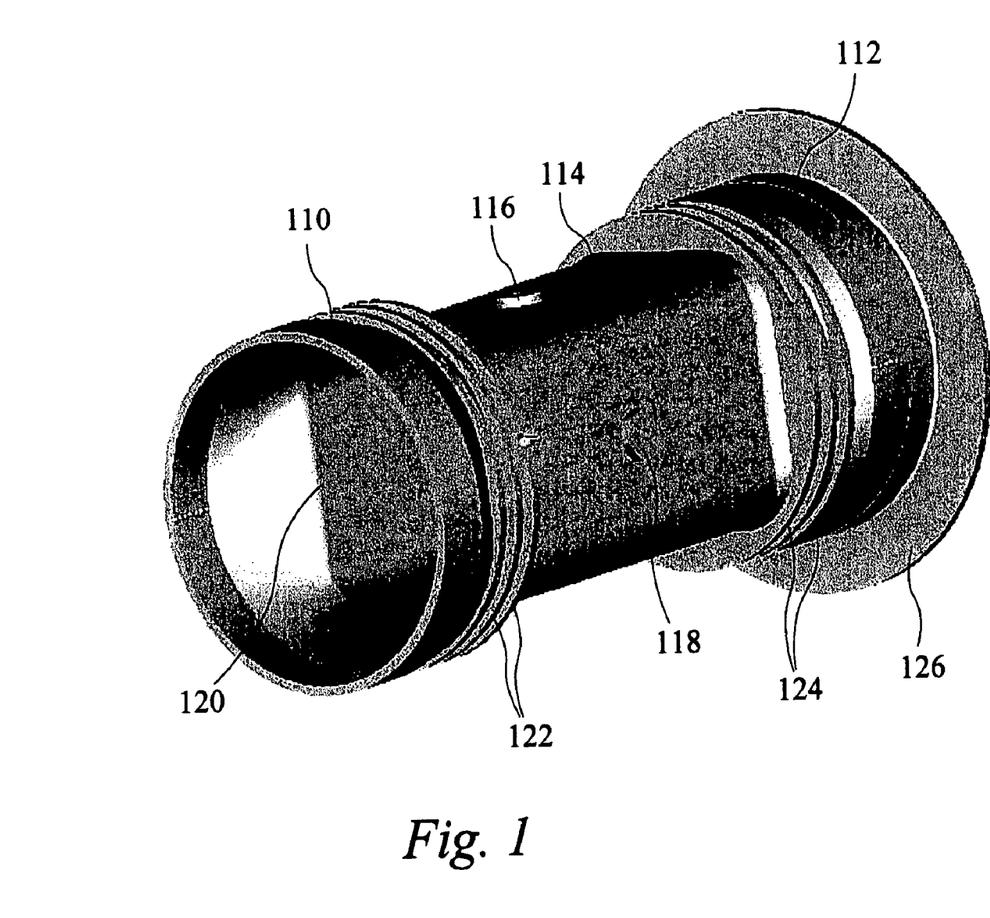
FIG. 1 illustrates one embodiment of a flow meter insert.

The flow meter insert illustrated in FIG. 1 comprises an inlet section 110 and an outlet section 112 of substantially circular cross-section and a central measuring section 114 of substantially square cross-section. The inlet 110 and outlet 112 sections of the present embodiment are of a similar cross-sectional shape to that of the flow conduit into which the insert is to be inserted, in this case they are circular. The dimensions of the inlet 110 and outlet 112 sections are such that these sections of the insert just fit within the flow conduit. Ribs 122, 124 maybe provided on the outer surface of one or both of the inlet 110 and outlet 112 sections. The ribs may provide rigidity to the insert and may enable the insert to be fixed more securely to the fluid conduit.

The insert may further be provided with one or more flanges. The insert of FIG. 1 comprises a flange 126 at one end of the insert. In this embodiment, the flange 126 is formed integrally with the insert, but, in an alternative embodiment, the flange may be coupled to the insert. The flange may allow the insert to be anchored securely to the flow conduit.

The measuring section 114 of the embodiment illustrated in FIG. 1 has a generally square cross-section. However, the corners of the square are rounded. This may allow the fluid to flow more smoothly through the measuring section 114. In alternative embodiments, the measuring section 114 may have a cross-section of a different shape, for example the measuring section 114 may have a rectangular, hexagonal or octagonal cross-section. The measuring section 114 may have any number of sides and may include curved portions, but it is preferred if the section has at least two generally or substantially parallel sides.

In the insert of FIG. 1, a transition region 120 is provided between the inlet section 110 and the measuring section 114 and between the measuring section 114 and the outlet section 112 so that a smooth transition may be provided between the cross-sectional shapes of the different sections. This may allow the fluid to flow smoothly through the measuring section 114. In an alternative embodiment, the transition region 120 may be provided only between the inlet section 110 and the measuring section 114.

Connecting portions 116, 118 may further be provided to allow electrodes and/or magnetic-field-producing means to be provided and operated to obtain a measurement of the fluid flow within the flow meter insert measuring section 118.

Figure 2:
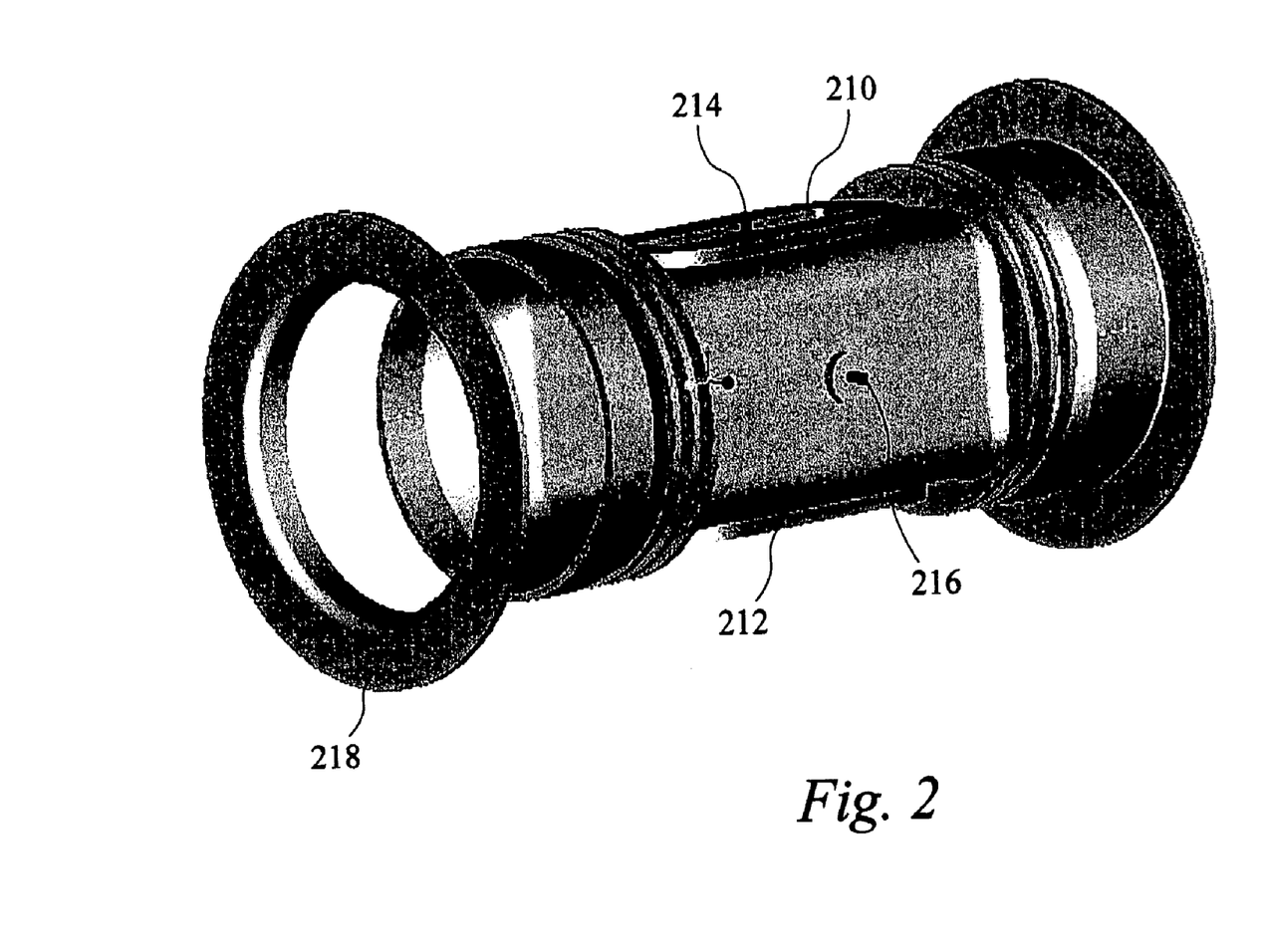
FIG. 2 illustrates a further embodiment of an insert.

FIG. 2 illustrates a further embodiment of a flow meter insert in which magnetic field generating means 210, 212, in this case in the form of coils, are provided on the surface of the insert. In alternative embodiments, the magnetic field generating means may be provided on the inside of the insert or on the outside of the flow conduit.

Electrodes, or connectors for electrodes 214, 216, which may be positioned within or outside the insert, are further provided in the present embodiment. Positive and/or negative electrodes maybe provided and a ground electrode may further be provided.

A further flange 218 is provided in the embodiment of FIG. 2. This flange 218 is detachable from the insert to allow the insert to be placed within the flow conduit, as discussed in more detail with reference to FIG. 3.

Figure 3:
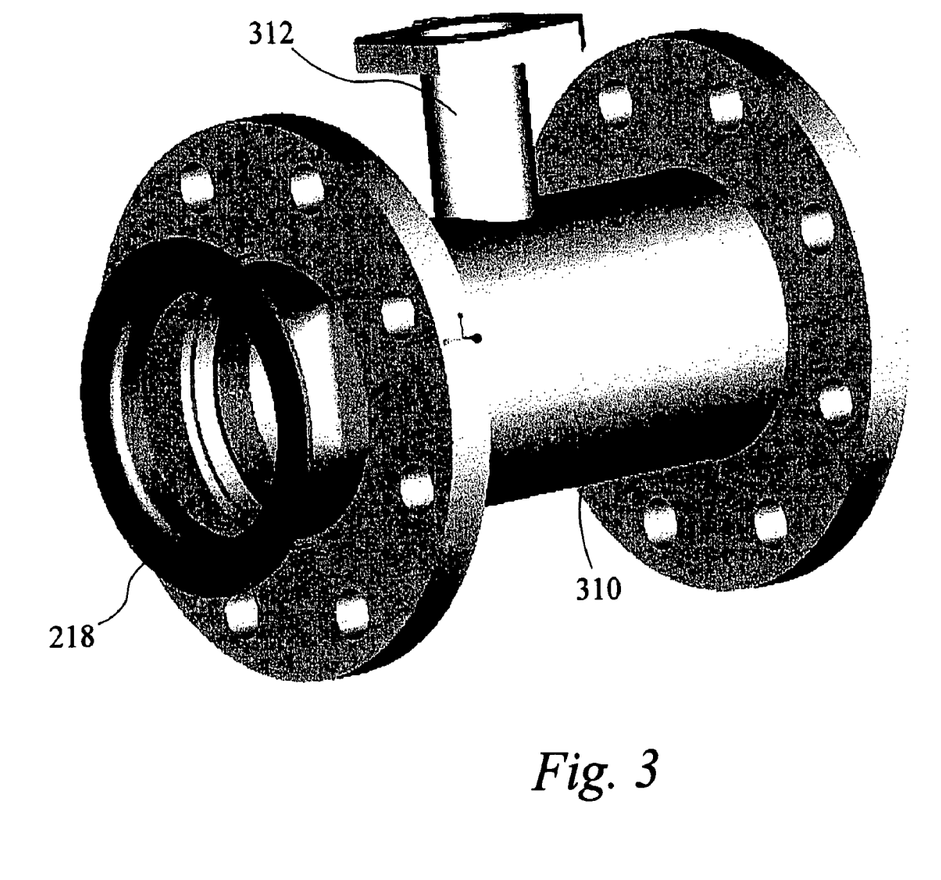
FIG. 3 is a schematic diagram of an insert according to one embodiment inserted into a flow conduit.

FIG. 3 illustrates an insert according to one embodiment positioned within a flow conduit 310. In the present embodiment, the insert is slid into the conduit and a flange 218 is coupled to the insert to retain the insert in place within the conduit. The flange 218 may also ensure that all of the fluid in the flow conduit passes within the insert.

In the embodiment of FIG. 3, the flow conduit 310 further comprises an outlet 312 which may be used to provide power to the magnetic field generating means and to the electrodes within the flow conduit 310 and may be used to allow readings to be obtained from the equipment within the conduit.

On insertion into the flow conduit, the insert is preferably back-potted to support the insert and stabilise it within the flow conduit. Any suitable potting compound may be used, for example epoxy resin or polyurethane.

The flow meter insert may be manufactured by injection moulding. The insert may be manufactured from a plastics material, such as ABS, from natural or synthetic rubber, or from another similar material.

An insert manufactured from materials that are less affected by elevated temperatures or corrosive fluids (such as PTFE, PFA, i.e. 'Teflon' family) maybe manufactured from methods already used by these industries (including machining, sintering, Transfer moulding, rotational moulding etc). The methods of manufacture for these materials is slightly different to 'normal' plastics due to the viscoelastic properties of these materials at their processing temperatures. Other more conventional plastics that could be used for less demanding specialist applications such as HDPE or PVDF could be manufactured from more conventional techniques such as injection moulding.

Figure 4:
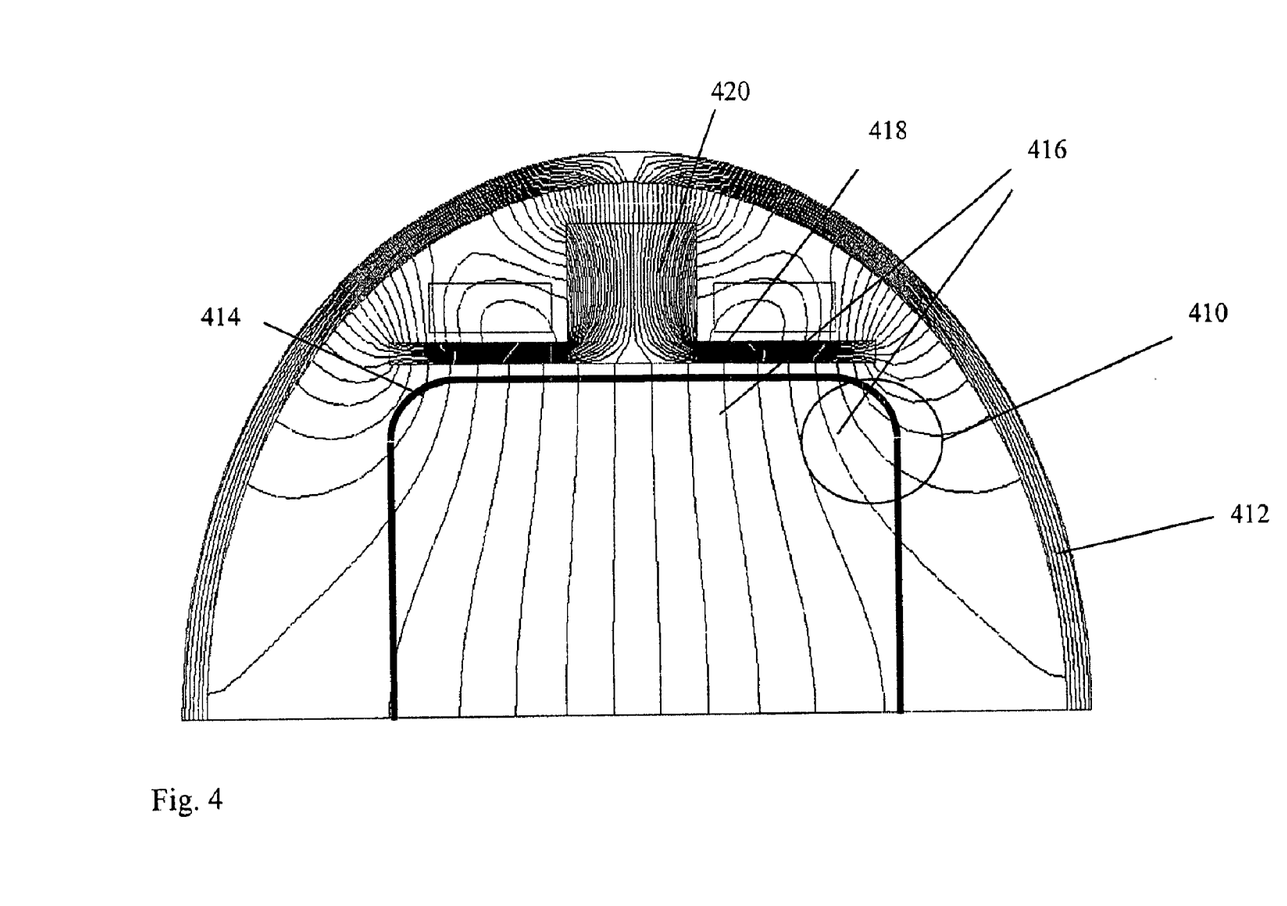
FIG. 4 is a schematic cross-sectional diagram of a substantially square section insert according to one embodiment.

A further, optional development of the embodiment of the insert described above may be to arrange the insert so that a perfectly uniform magnetic field is provided throughout the measuring section. With reference to FIG. 4, the insert 414 of the embodiment described above may be inserted into a cylindrical pipe or fluid flow conduit 412 with the magnetic return circuit being made with the pipe or with a layer of silicon steel wrapped inside the pipe. As illustrated in FIG. 4 at 410, the magnetic field within the insert may not be uniform throughout the insert, in fact, in some embodiments, the magnetic flux lines 416 may be facing in the wrong direction in the corners of the measuring section 410. This is due to two factors: firstly, the proximity of the return circuit 412 (the flow conduit in FIG. 4) to the edge of the pole piece plate and secondly the amount of room for the magnetic pole piece 418 and coil 420.

Having a non-uniform magnetic field throughout the insert may have an adverse affect on the performance of the sensor or flow meter. A number of developments may optionally be implemented to improve this design problem.

Figure 5:
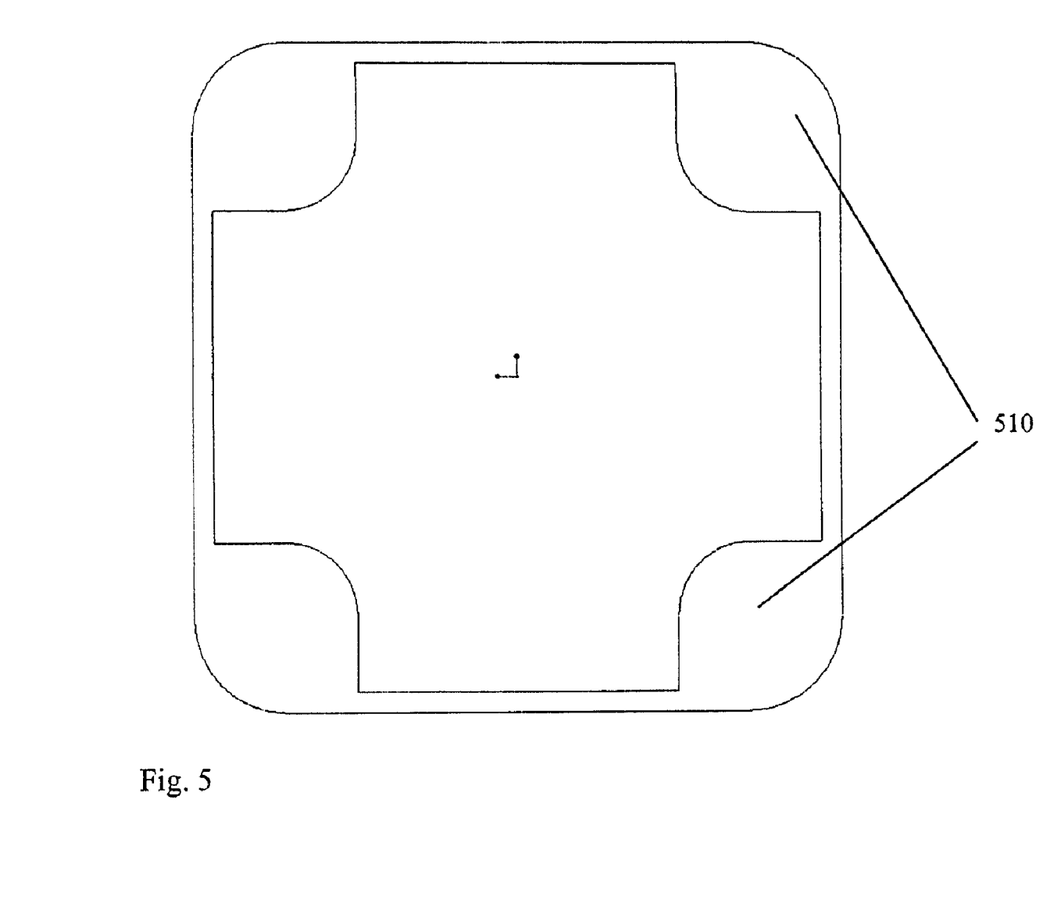
FIG. 5 is a schematic cross-sectional diagram of a substantially square section insert with infilled corner sections according to a further embodiment.

As illustrated schematically in FIG. 5, the corners of the insert 510 may be filled with material to make a flow measuring section almost in the shape of a 'Maltese cross'. This embodiment may alleviate non-uniform field problem by ensuring that the fluid only passes through the uniform field sections.

Figure 6A:
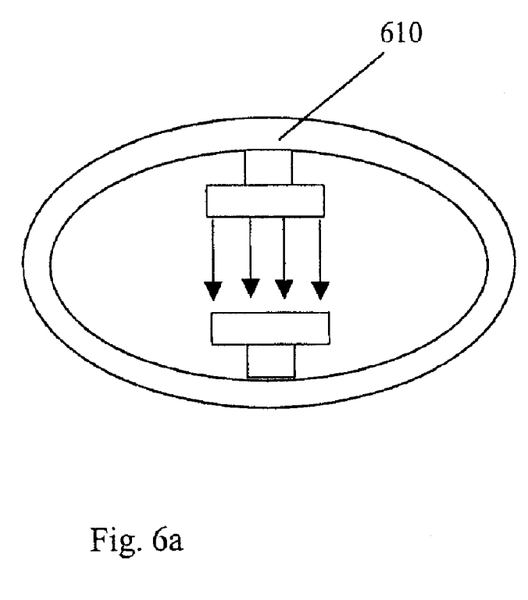
FIG. 6a is a schematic cross-sectional diagram of an insert positioned within a flow conduit of substantially elliptical cross-section according to a further embodiment.
Figure 6B:
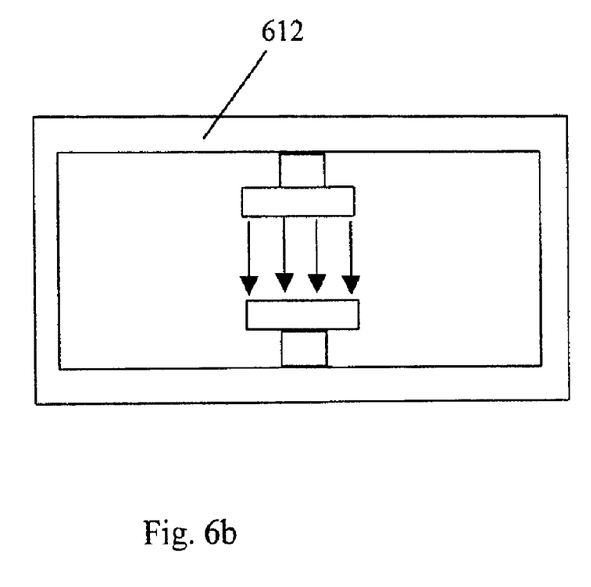
FIG. 6b is a schematic cross-sectional diagram of an insert positioned within a flow conduit of substantially rectangular cross-section according to a further embodiment.

In an alternative embodiment, the shape of the pressure containment vessel, for example the flow conduit, may be changed so that the magnetic flux lines/field preferentially passes across the measuring region rather than back to the return circuit. For example, as shown in FIG. 6a, the vessel 610 may be implemented in a substantially elliptical form or, as shown in FIG. 6b, the vessel 612 may be implemented in a substantially rectangular or square form.

Figure 7:
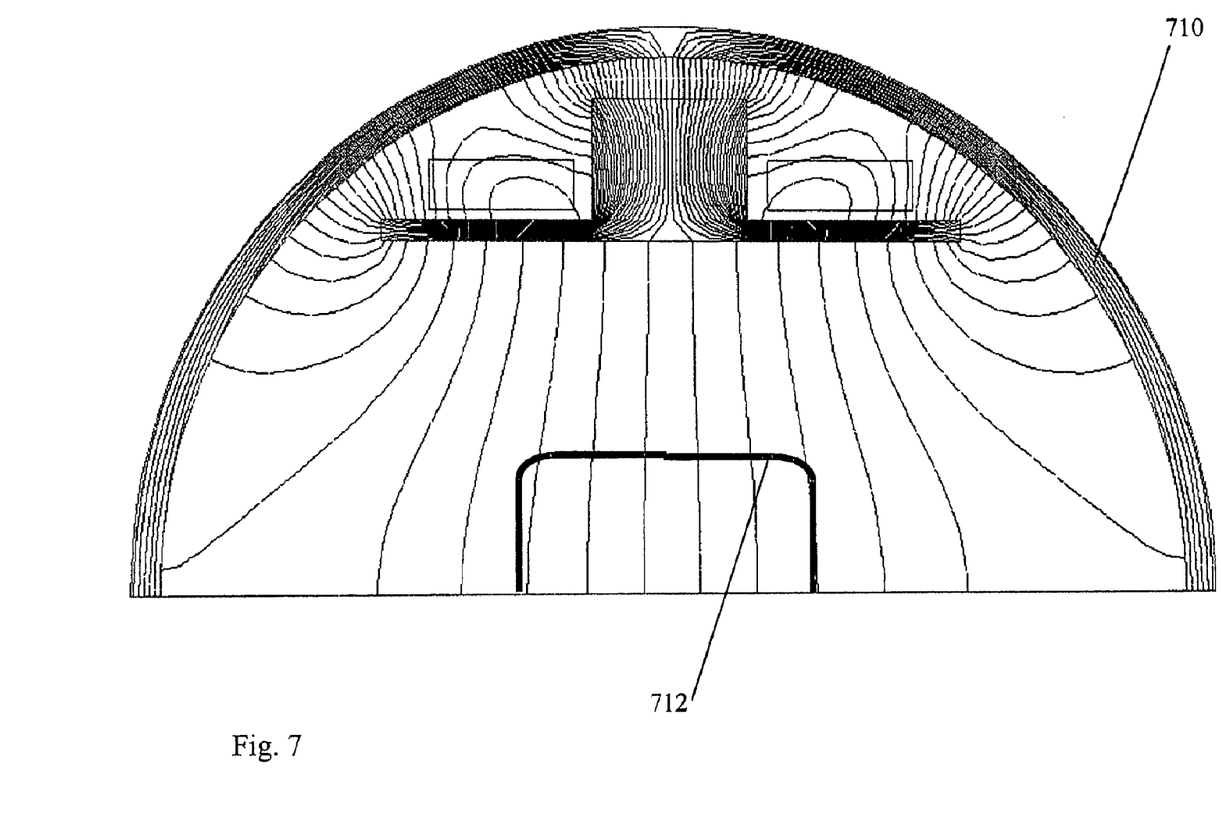
FIG. 7 is a schematic cross-sectional diagram of an insert according to a further embodiment.

In a further alternative embodiment, an example of which is illustrated in FIG. 7, the diameter of the pressure containment vessel 710 may be increased or the size of the measuring section 712 may be reduced so that the measuring section only falls within the uniform field.

Alternative configurations of the insert and the pressure containment vessel maybe implemented to keep the magnetic field substantially uniform within the measuring section and such configurations would be obvious to one skilled in the art.

The description above is provided by way of illustration only and further modifications and variations of detail would be possible to one skilled in the art. Each feature disclosed in this specification (which term includes the claims) and/or shown in the drawings may optionally be incorporated in the invention independently of other disclosed and/or illustrated features. Statements in this specification of the "objects of the invention" relate to certain embodiments of the invention, but not necessarily to all embodiments of the invention falling within the claims.

What is claimed is:

1. An electromagnetic flow meter apparatus comprising:
  an elongate section of flow conduit through which fluid can flow along a flow path, the flow conduit having a generally circular flow conduit cross-section in a direction transverse to said flow path;
  an elongate molded insert positioned within and extending along said section of flow conduit, the insert comprising the following integrally molded components:
    an inlet arranged to receive fluid flowing along said flow conduit the inlet having a generally circular cross-sectional shape in a direction transverse to a longitudinal axis of the insert and having cross-sectional dimensions similar to cross-sectional dimensions of the flow conduit into which the insert is adapted to be inserted;
    an outlet configured to output fluid having flowed through said insert into said section of flow conduit, the outlet having a generally circular cross-sectional shape in a direction transverse to the longitudinal axis of the insert and having similar dimensions to those of the flow conduit into which the insert is adapted to be inserted; and
    a measuring section positioned between said inlet and outlet, said measuring section having an inner surface which defines a measuring channel through which fluid from said inlet can flow and wherein said measuring channel has a cross-section in a direction transverse to said flow path which has more than four sides and which is different from said flow conduit cross-section.

2. The apparatus according to claim 1, wherein said measuring section has a cross-section in a direction transverse to said flow path with two pairs of substantially parallel sides and rounded corners.

3. The apparatus according to claim 1, wherein said measuring section has a cross-section in a direction transverse to said flow path which is substantially octagonal.

4. An electromagnetic flow meter apparatus comprising:
  an elongate section of flow conduit through which fluid can flow along a flow path, the flow conduit having a generally circular flow conduit cross-section in a direction transverse to said flow path;
  an elongate molded insert positioned within and extending along said section of flow conduit, the insert comprising the following integrally molded components:
    an inlet arranged to receive fluid flowing along said flow conduit the inlet having a generally circular cross-sectional shape in a direction transverse to a longitudinal axis of the insert and having cross-sectional dimensions similar to cross-sectional dimensions of the flow conduit into which the insert is adapted to be inserted;
    an outlet configured to output fluid having flowed through said insert into said section of flow conduit, the outlet having a generally circular cross-sectional shape in a direction transverse to the longitudinal axis of the insert and having similar dimensions to those of the flow conduit into which the insert is adapted to be inserted; and
    a measuring section positioned between said inlet and outlet, said measuring section having an inner surface which defines a measuring channel through which fluid from said inlet can flow and wherein said measuring channel has a cross-section in a direction transverse to said flow path which has one or more straight portions and one or more curved portions and which is different from said flow conduit cross-section.

5. The apparatus according to claim 4, wherein said measuring section has a cross-section in a direction transverse to said flow path with two pairs of substantially parallel sides and rounded corners.

6. The apparatus according to claim 4, wherein said measuring section has a cross-section in a direction transverse to said flow path which is substantially octagonal.

7. An electromagnetic flow meter apparatus comprising:
  an elongate section of flow conduit through which fluid can flow along a flow path, the flow conduit having a generally circular flow conduit cross-section in a direction transverse to said flow path;
  an elongate molded insert positioned within and extending along said section of flow conduit, the insert comprising the following integrally molded components:
    an inlet arranged to receive fluid flowing along said flow conduit the inlet having a generally circular cross-sectional shape in a direction transverse to a longitudinal axis of the insert and having cross-sectional dimensions similar to cross-sectional dimensions of the flow conduit into which the insert is adapted to be inserted;

an outlet configured to output fluid having flowed through said insert into said section of flow conduit, the outlet having a generally circular cross-sectional shape in a direction transverse to the longitudinal axis of the insert and having similar dimensions to those of the flow conduit into which the insert is adapted to be inserted; and a measuring section positioned between said inlet and outlet, said measuring section having an inner surface which defines a measuring channel through which fluid from said inlet can flow and wherein said inner surface has at least two substantially parallel sides which extend along said flow path, wherein said measuring channel has a cross-section in a direction transverse to said flow path which is non-rectangular and which is different from said flow conduit cross-section.

8. The apparatus according to claim 7, further comprising a transition section between at least one of the inlet and the outlet and the measuring section, wherein the cross-sectional shape of the insert in a direction transverse to said flow path, transforms smoothly from the shape of the inlet and/or the outlet to the shape of the measuring section in the transition section.

9. The apparatus according to claim 7, wherein the cross-sectional area of the measuring section covers less than about 50% of the cross-sectional area of the flow conduit.

10. The apparatus according to claim 7, wherein the insert is manufactured substantially from one of a thermoplastic material, ABS (Acrylonitrile butadiene Styrene), a soft rubber material, a hard rubber material, PTFE, PVDF, thermoset material, a reinforced thermoset material, and a reinforced thermoplastics material.

11. The apparatus according to claim 10, wherein the insert is manufactured substantially from a fiberglass material.

12. The apparatus according to claim 10, wherein the insert is manufactured substantially from a glass-loaded plastic material.

13. The apparatus according to claim 7, wherein the cross-sectional size and/or shape of the insert are arranged so that a substantially uniform magnetic field may be applied over substantially the whole cross-sectional area of the measuring section of the insert.

14. The apparatus according to claim 7, further comprising at least one of electrodes, magnetic field generating means, and an electrostatic screen provided integrally with the insert or coupled to the insert.

15. The apparatus according to claim 7, wherein the insert is back-potted upon insertion into said flow conduit.

16. The apparatus according to claim 7, wherein the insert has cross-section in a direction transverse to said flow path which has one or more straight portions and one or more curved portions.

17. The apparatus according to claim 7, wherein the insert comprises a detachable flange configured to retain the insert in the flow conduit.

18. The apparatus according to claim 7, wherein the flow conduit comprises a power outlet that extends away from the flow path, the power outlet configured to provide power to magnetic field generating means and to electrodes of the flow meter and to allow readings to be obtained from equipment within the flow conduit.

19. The apparatus according to claim 7, wherein one or both of the inlet and the outlet of said insert comprises ribs configured to provide rigidity to the insert.

20. The apparatus according to claim 7, wherein said measuring section has a cross-section in a direction transverse to said flow path with two pairs of substantially parallel sides and rounded corners.

21. The apparatus according to claim 7, wherein said measuring section has a cross-section in a direction transverse to said flow path which is substantially octagonal.

22. An elongate molded insert comprising the following integrally molded components:

an inlet arranged to receive fluid flowing along a flow conduit, the inlet having a generally circular cross-sectional shape in a direction transverse to a longitudinal axis of the insert and having similar dimensions to those of the flow conduit into which the insert is adapted to be inserted;

an outlet configured to output fluid having flowed through said insert into said section of flow conduit, the outlet having a generally circular cross-sectional shape in a direction transverse to the longitudinal axis of the insert and having similar dimensions to those of the flow conduit into which the insert is adapted to be inserted; and a measuring section positioned between said inlet and outlet, said measuring section having an inner surface which defines a measuring channel through which fluid from said inlet can flow and wherein said inner surface has at least two substantially parallel sides which extend along said flow path, wherein said measuring channel has a cross-section in a direction transverse to said flow path which is non-rectangular and which is different from said flow conduit cross-section.

23. The apparatus according to claim 22, wherein said measuring section has a cross-section in a direction transverse to said flow path with two pairs of substantially parallel sides and rounded corners.

24. The apparatus according to claim 22, wherein said measuring section has a cross-section in a direction transverse to said flow path which is substantially octagonal.

* * * * *